US007210123B2

(12) United States Patent
Makiyama

(10) Patent No.: US 7,210,123 B2
(45) Date of Patent: Apr. 24, 2007

(54) SOFTWARE EVALUATION SYSTEM HAVING SOURCE CODE AND FUNCTION UNIT IDENTIFICATION INFORMATION IN STORED ADMINISTRATION INFORMATION

(75) Inventor: Fumihiro Makiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 517 days.

(21) Appl. No.: 10/245,318

(22) Filed: Sep. 18, 2002

(65) Prior Publication Data

US 2003/0056151 A1 Mar. 20, 2003

(30) Foreign Application Priority Data

Sep. 19, 2001 (JP) .............................. 2001-284765

(51) Int. Cl.
*G06F 9/44* (2006.01)
(52) U.S. Cl. ...................... 717/120; 717/124; 717/126; 717/131
(58) Field of Classification Search ........ 717/106–172; 714/13–43; 707/10; 710/18; 718/105; 709/230
See application file for complete search history.

(56) References Cited

U.S. PATENT DOCUMENTS

| | | | | |
|---|---|---|---|---|
| 5,450,586 | A * | 9/1995 | Kuzara et al. | 717/124 |
| 5,640,556 | A * | 6/1997 | Tamura | 707/10 |
| 6,212,581 | B1 * | 4/2001 | Graf | 710/18 |
| 6,363,497 | B1 * | 3/2002 | Chrabaszcz | 714/13 |
| 6,742,177 | B1 * | 5/2004 | Dorak et al. | 717/124 |
| 6,915,457 | B1 * | 7/2005 | Miller | 714/43 |
| 2002/0019973 | A1 * | 2/2002 | Hayashida | 717/106 |
| 2002/0087962 | A1 * | 7/2002 | Hudson et al. | 717/172 |
| 2002/0112064 | A1 * | 8/2002 | Eastvold | 709/230 |
| 2002/0133806 | A1 * | 9/2002 | Flanagan et al. | 717/123 |
| 2005/0125798 | A1 * | 6/2005 | Peterson | 718/105 |

FOREIGN PATENT DOCUMENTS

| | | |
|---|---|---|
| JP | H02-14337 A | 1/1990 |
| JP | H04-90031 A | 3/1992 |
| JP | H08-095775 A | 4/1996 |
| JP | H08-297579 A | 11/1996 |
| JP | H10-320186 A | 12/1998 |
| JP | H11-095988 A | 4/1999 |
| JP | 2000-137603 A | 5/2000 |
| JP | 2000-148458 A | 5/2000 |
| JP | 2001-117794 A | 4/2001 |
| JP | 2001-154889 A | 6/2001 |

* cited by examiner

*Primary Examiner*—Meng-Al T. An
*Assistant Examiner*—Mark P. Francis
(74) *Attorney, Agent, or Firm*—Sughrue, Mion, PLLC

(57) ABSTRACT

A database stores as administration information of a program, source code identification information for identifying a source code representing the program, function unit identification information for identifying function units of the program which are defined by the source code, and an address of an administrator of the source code. An evaluation computer performs an evaluation process on a program to be evaluated to determine whether the program includes any error command or module, and when determining that the program includes an error command or module, obtains administration information of the program to be evaluated from the database and externally sends source code identification information and function unit identification information included in the obtained administration information to an address included in the obtained administration information.

14 Claims, 7 Drawing Sheets

FIG.5

EXAMPLE OF ERROR REPORTING MAIL

```
From: EVALUATOR
To: SOURCE ADMINISTRATOR (AdmID:3)
Subject: SOFTWARE EVALUATION RESULT
Date: Sat 1, Sep 2001 12:30:00 GMT
_____

As result of evaluation, software(file name:7.c,
file ID:7, command ID:EE) is detected as error.
Please correct this error.

Detail of error information
................................................
..........................................
```

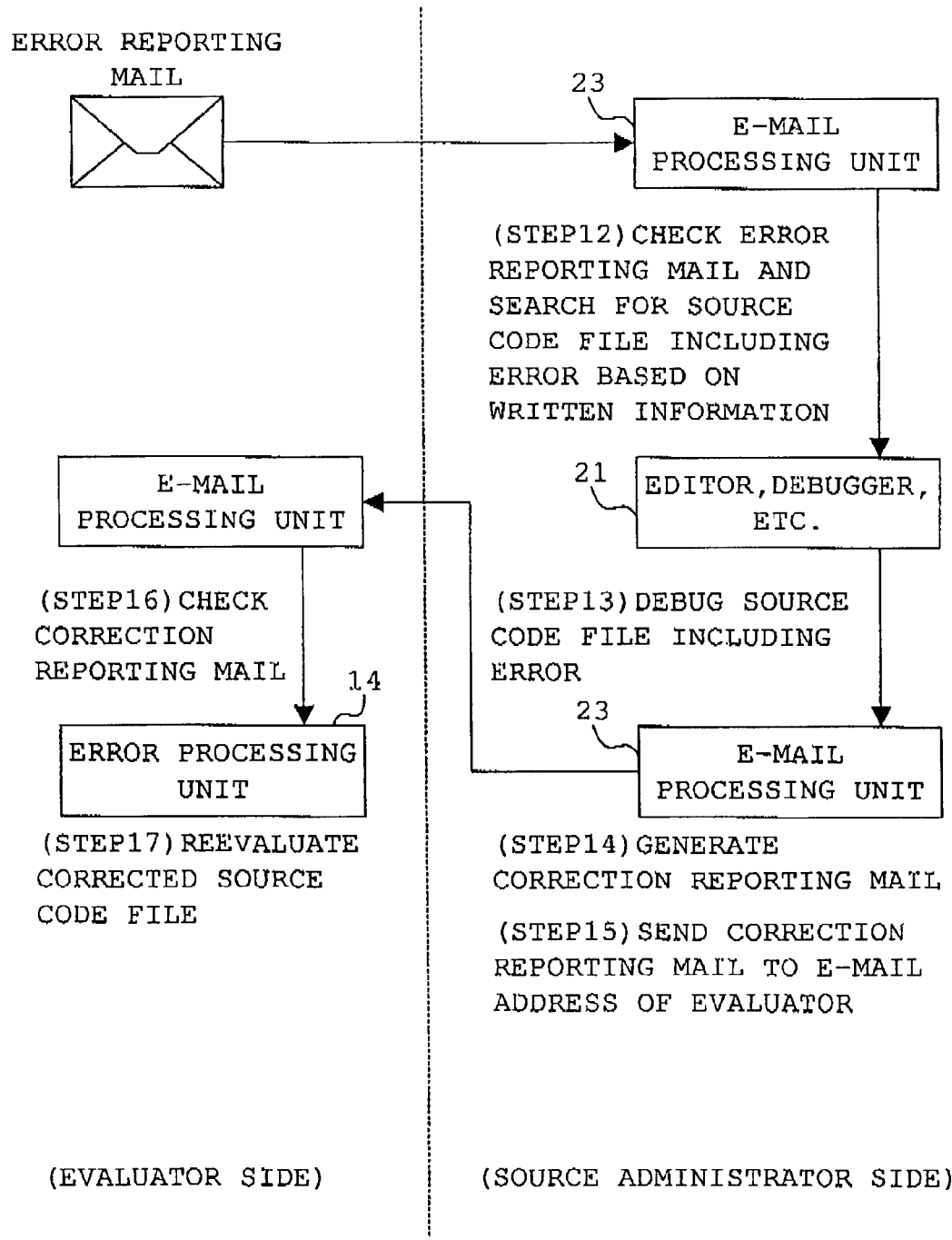

SOFTWARE EVALUATION SYSTEM HAVING SOURCE CODE AND FUNCTION UNIT IDENTIFICATION INFORMATION IN STORED ADMINISTRATION INFORMATION

BACKGROUND OF THE INVENTION

1. Field of the Invention

The present invention relates to a software evaluation system and a software evaluation apparatus. Particularly, the present invention relates to a software evaluation system and a software evaluation apparatus for evaluating or debugging program components such as basic modulus and commands, in development of application software or firmware for devices.

2. Description of the Related Art

In development of software or firmware, if software or firmware is evaluated only by the programmer who has actually coded the software or firmware, objective evaluation of the software or firmware cannot be achieved.

Thus, software evaluation by a third party is required. In this case, the evaluator and the programmer evaluate the software from their respective viewpoints. The programmer tends to consume time in chucking the source codes of modules and commands created by him/herself. On the other hand, the evaluator is likely to use time in conducting application tests using the once created commands and modules based on predetermined evaluation points, to totally check the software, A typical flow of software evaluation process is as follows.

First, the evaluator performs analysis/evaluation of the target program, using a predetermined evaluation tool. If an error occurs in a region of the target program or an error is detected when performing evaluation, the evaluator reports the existence of the error to the programmer who has programmed the error region. Based on this report, the programmer searches out the source code file which forms the cause of the error, and checks and debugs the source code file.

As a conventional software evaluation tool, for example, Unexamined Japanese Patent Application KOKAI Publication No. 2001-117794 discloses a program automatic evaluation system. This system automatizes the evaluation process. An evaluation tool of this system generates evaluation point data and expected value data based on an evaluation target source code. Then, the evaluation tool sends the evaluation point data together with commands to a target computer. The target computer generates an evaluation program based on the evaluation target source code in advance. Then, the target computer analyzes the commands sent from the evaluation tool, inputs the evaluation point data into the evaluation program, and obtains output of evaluation results. Then, the target computer returns the obtained evaluation results to the evaluation tool. The evaluation tool performs evaluation by comparing the evaluation results with the expected value data.

Unexamined Japanese Patent Application KOKAI Publication No. 2001-154889 discloses an apparatus and method of displaying a program performance graph. This program performance graph display apparatus performs its unique performance analysis process on a program, and automatically displays the result of analysis. This reduces the workload of evaluation. Further, this program performance graph display apparatus displays relationship between characteristic values helpful for evaluating program modules and segments to be evaluated by a graph of three-dimensional coordinates. As a result, contents of evaluation can be rapidly comprehended.

Various efforts have been made for automation of software evaluation processes, as described above.

However, conventional software evaluation processes have the following problems. First, a lot of time and labor are required since the conventional processes include a program evaluation process, report of the evaluation results including errors and defects to the programmer, and feedback process by the programmer.

Second, when it comes to development of large-scaled software or firmware, there are included thousands of source code files to be processed. Therefore, man cannot easily keep track of so many files.

Third, when error information is reported from the evaluator to the programmer, the programmer has to unreliably find out the source code file which is related by the error among the many files with complexity.

SUMMARY OF THE INVENTION

The present invention was made in view of the above problems. Accordingly, the first object of the present invention is to provide a software evaluation system and a software evaluation tool which, in evaluation of software or firmware to be developed, can promptly report detailed evaluation results including error information of the program to the programmer.

The second object of the present invention is to provide a software evaluation system and a software evaluation tool for utilizing administration information regarding source code files which constitute software, a source code file administrator, commands and modules to be defied, etc., in development of software or firmware.

To achieve the above objects, a software evaluation system according to a first aspect of the present invention comprises:

a storage device which stores a database in which as administration information of a program, source code identification information for identifying a source code representing the program, function unit identification information for identifying function units of the program which are defined by the source code, and an address of an administrator of the source code are stored; and an evaluation computer which performs an evaluation process on a program to be evaluated to determine whether the program to be evaluated includes any function unit that does not function correctly, and when determining that the program includes such a function unit, obtains administration information of the program to be evaluated from the database and externally sends source code identification information and function unit identification information included in the obtained administration information to an address included in the obtained administration information.

The software evaluation system may further comprise a source administration computer which affixes to the source code representing the program, administration information thereof.

The evaluation computer may extract the administration information affixed to the source code and store the extracted administration information in the database.

The evaluation computer may encrypt the source code identification information and the function unit identification information before externally sending them.

The program to be evaluated may be stored as firmware in a predetermined device.

The evaluation computer may function as a (driver for driving the predetermined device.

A software evaluation apparatus according to a second aspect of the present invention is constituted by a computer having access to a database in which as administration information of a program, source code identification information for identifying a source code representing the program, function unit identification information for identifying function units of the program which are defined by the source code, and an address of an administrator of the source code are stored, wherein the computer performs an evaluation process on a program to be evaluated to determine whether the program to he evaluated includes any function unit that does not function correctly, and when determining that the program includes such a function unit, obtains administration information of the program to be evaluated from the database and externally sends source code identification information and function unit identification information included in the obtained administration information to an address included in the obtained administration information.

Administration information regarding the source code representing the program may be affixed to the source code.

The computer may extract the administration information affixed to the source code and store the extracted administration information in the database.

The computer may encrypt the source code identification information and the function unit identification information before externally sending them.

The program to be evaluated may be stored as firmware in a predetermined device.

The computer may function as a driver for driving the predetermined device.

Function units of the program may be constituted by commands and/or modules constituting the program.

A software evaluation method according to a third aspect of the present invention comprises:

storing as administration information of a program, source code identification information for identifying a source code representing the program, function unit identification information for identifying function units of the program which are defined by the source code, and an address of an administrator of the source code in a database; and performing an evaluation process on a program to be evaluated to determine whether the program to be evaluated includes any function unit that does not function correctly, and when determined that the program includes such a function unit, obtaining administration information of the program to be evaluated from the database, and externally sending source code identification information and function unit identification information included in the obtained administration information to all address included in the obtained administration information.

Administration information regarding the source code representing the program may be affixed to the source code.

The storing may extract the administration information affixed to the source code and store the extracted administration information in the database.

A computer-readable recording medium according to a fourth aspect of the present invention stores a program for controlling a computer having access to a database in which as administration information of a program, source code identification information for identifying a source code representing the program, function, unit identification information for identifying function units of the program which are defined by the source code, and an address of an administrator of the source code are stored, to perform the functions of performing an evaluation process on a program to be evaluated to determine whether or not the program to be evaluated includes any function unit that does not function correctly, and when determining that the program includes such a function unit, obtaining administration information of the program to be evaluated from the database, and externally sending source code identification information and function unit identification information included in the obtained administration information to an address included in the obtained administration information.

A computer data signal embedded in a carrier wave according to a fifth aspect of the present invention represents a program for controlling a computer having access to a database in which as administration information of a program, source code identification information for identifying a source code representing the program, function unit identification information for identifying function units of the program which are defined by the source code, and an address of an administrator of the source code are stored, to perform the functions of performing an evaluation process on a program to be evaluated to determine whether or not the program to be evaluated includes any function unit that does not function correctly, and when determining that the program includes such a function unit, obtaining administration information of the program to be evaluated from the database, and externally sending source code identification information and function unit identification information included in the obtained administration information to an address included in the obtained administration information A computer-readable recording medium according to a sixth aspect of the present invention stores a program for controlling a computer to perform the functions of:

storing a database in which as administration information of a program, source code identification information for identifying a source code representing the program, function unit identification information for identifying function units of the program which are defined by the source code, and an address of an administrator of the source code are stored; and performing an evaluation process on a program to be evaluated to determine whether or not the program to be evaluated includes any function twit that does not function correctly, and when determining that the program includes such a function unit, obtaining administration information of the program to be evaluated from the database, and externally sending source code identification information and function unit identification information included in the obtained administration information to an address included in the obtained administration information.

A computer data signal embedded in a carrier wave according to a seventh aspect of the present invention represents a program for controlling a computer to perform the functions of:

storing a database in which as administration information of a program, source code identification information for identifying a source code representing the program, function unit identification information for identifying function units of the program which are defined by the source code, and an address of an administrator of the source code are stored; and performing an evaluation process on a program to be evaluated to determine whether or not the program to be evaluated includes any function unit that does not function correctly, and when determining that the program includes such a function unit, obtaining administration information of the program to be evaluated from the database, and externally sending source code identification information and function unit identification information included in the obtained administration information to an address included in the obtained administration information.

BRIEF DESCRIPTION OF THE DRAWINGS

These objects and other objects and advantages of the present invention will become more apparent upon reading of the following detailed description and the accompanying drawings in which:

FIG. 5 is a diagram showing an example of an error reporting mail

FIG. 8 is a diagram for explaining processes to be performed after an error reporting process.

DETAILED DESCRIPTION OF THE PREFERRED EMBODIMENT

The embodiment of the present invention will now be specifically explained with reference to the attached drawings.

Figure 1:
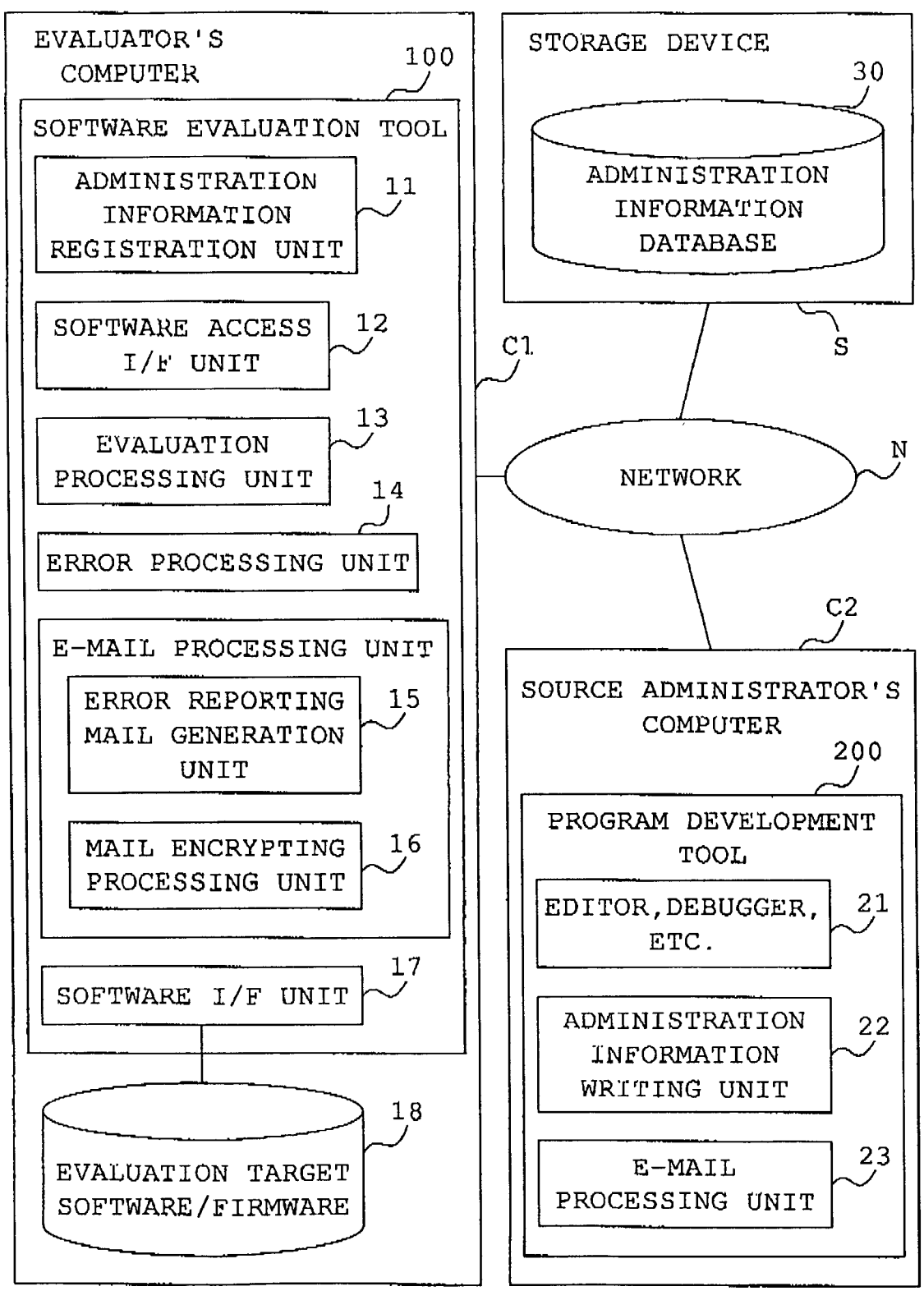
FIG. 1 is a diagram showing a structure of a software evaluation system according to the embodiment of the present invention.

FIG. 1 is a block diagram showing a structure of a software evaluation system according to the embodiment of the present invention.

This software evaluation system is used by a group engaged in development of software or firmware.

This software evaluation system comprises an evaluator's computer C1, a source administrator's computer C2, and a storage device S. The evaluator's computer C1, the source administrator's computer C2, and the storage device S are connected to one another through a network N constituted by a LAN (Local Area Network), the Internet, or the like.

The evaluator's computer C1 may be such a terminal computer as used by an evaluator who is in charge of processes for evaluating target software or firmware to be developed. The evaluator's computer C1 comprises a processor constituted by a CPU (Central Processing Unit) or the like, a main memory constituted by a RAM (Random Access Memory) or the like, an external storage constituted by a hard disk device or the like, a network interface circuit for connecting to the network N, an input unit constituted by a keyboard, a mouse, and the like, and an output unit constituted by a liquid crystal display or the like. The processor, the main memory, the external storage, the network interface circuit, the input unit, and the output unit are all connected by a bus. The operator or the evaluator supplies data to the processor or inputs an instruction for executing a program by operating the input unit, thereby to control the operation of the evaluator's computer C1.

The main memory of the evaluator's computer C1 has a memory area to be used as a work area of the processor of the evaluator's computer C1. The network interface circuit of the evaluator's computer C1 is constituted by a control circuit for controlling data exchange using a predetermined protocol among the processor of the evaluator's computer C1, the source administrator's computer C2, and the storage device S through the network N.

A software evaluation tool 100 is preinstalled in the external storage of the evaluator's computer C1. The processor of the evaluator's computer C1 reads out the software evaluation tool 100 from the external storage of the evaluator's computer C1 in accordance with an instruction of the evaluator who operates the evaluator's computer C1, loads the software evaluation tool 100 onto the main memory of the evaluator's computer C1, and executes the software evaluation tool 100.

The software evaluation tool 100 is software including modules for realizing each of the functions of an administration information registration unit 11, a software access I/F (interface) unit 12, an evaluation processing unit 13, an error processing unit 14, a error reporting mail generation unit 15, and a mail encrypting processing unit 16. Those function modules control later-described processes performed by the evaluator's computer C1, in manners described later. The evaluation processing unit 13 is the function module for controlling execution of a predetermined evaluation test to be conducted on a program. In the following explanation, the error reporting mail generation unit 15 and the mail encrypting processing unit 16 are collectively called as an e-mail processing unit of the software evaluation tool 100.

The administration information registration unit 11 controls processes of acquiring a source code file constituting target software to be developed under the control of the software access I/F unit 12, extracting administration information written in the source code file, and storing the extracted administration information in an administration information database 30.

The software access I/F unit 12 controls the evaluator's computer C1's access to the external storage, when the processor of the evaluator's computer C1 reads a source code file including administration information to be extracted, or reads an object code to be evaluation-processed from the external storage.

The evaluation processing unit 13 controls a predetermined evaluation process to be conducted on evaluation target software/firmware 18. The evaluator conducts the evaluation process on the whole or part of the evaluation target software/firmware 18 in accordance with a prepared evaluation point list.

The error processing unit 14 controls the evaluator's computer C1 to perform a later-described error bandling process in a case where the evaluation process performed under the control of the evaluation processing unit 13 ends up in a result that a command or module has an error or defect.

The error reporting mail generation unit 15 controls a process of automatically generating an error reporting mail indicating a evaluation result that an error or defect is found when such result is obtained in the evaluation process, and sending the generated mail to the source administrator. The error reporting mail generation unit 15 also controls a process of receiving a correction reporting mail to be described later.

The evaluator's computer C1 sends the generated error reporting mail to the source administrator after coding the generated mail in accordance with a common key coding method under the control of the mail encrypting processing unit 16.

The error reporting mail generation unit 15 and the mail encrypting processing unit 16 may be constituted by existing e-mail software.

The source administrator's computer C2 may be such a terminal computer as used by a source administrator (source creator, programmer) who creates (codes) each program modules constituting target software or firmware to be developed. The source administrator's computer C2 has substantially the same structure as that of the evaluator's computer C1.

A main memory of the source administrator's computer C2 has a storage area to be used as a work area of a processor of the source administrator's computer C2. A network interface circuit of the source administrator's computer C2 is constituted by a control circuit for controlling data exchange among the processor of the source administrator's computer C2, the evaluator's computer C1, and the storage device S through the network N.

A program development tool 200 is preinstalled in an external storage of the source administrator's computer C2. The processor of the source administrator's computer C2 reads out the program development tool 200 from the external storage of the source administrator's computer C2 in accordance with an instruction of the source administrator who operates the source administrator's computer C2, loads the program development tool 200 onto the main memory of the source administrator's computer C2, and executes the program development tool 200.

The program development tool 200 is software including utility software 21, and also including function blocks for realizing utility software 21, all administration information writing unit 22, and an e-mail processing unit 23. The utility software 21 includes an editor used for writing a source code, ad a debugger used by the source administrator to debug a source code. The administration information writing unit 22 controls a process of writing administration information in a source code file. The e-mail processing unit 23 controls a later described e-mail processing.

The administration information writing unit 22 controls a process of writing in a source code file created by a programmer, administration information regarding the source code file. Specifically, the administration information includes the name of the source code file, an identification code for identifying the source administrator, identification codes for identifying a command and module defined in the source code file. The location of the administration information in the source code file may be the header of the source code file, for example. The administration information to he written in the source code file is input by the source administrator or the like who operates the source administrator's computer C2. This inputting operation may be performed directly using the editor, or by means of a predetermined program.

The e-mail processing unit 23 controls a process of receiving al error reporting mail from the evaluator's computer C1. The e-mail processing unit 23 also controls a process of generating a correction reporting mail in accordance with an instruction of the source administrator or the like who operates the source administrator's computer C2, and sending this correction reporting mail to an e-mail address of the evaluator. The source administrator, who checks an error reporting mail and corrects a corresponding source code file, sends this correction reporting mail in order to inform the evaluator that the error has been corrected.

The storage device S is constituted by a server computer for example, and stores the administration information database 30 for registering administration information regarding software or firmware to be developed. Source code files and object code files of program components constituting target software or firmware to be developed are collectively stored in a predetermined storage area, or dispersed in a plurality of devices connected to the network N. Among the source code files and object code files of the software to be developed, the target file to be evaluated (evaluation target software/firmware 18) is stored in the external storage of the evaluator's computer C1, as shown in FIG. 1. The processor of the evaluator's computer C1 accesses the evaluation target software/firmware 18 under the control of a software I/F unit 17. In a case where the evaluation target software/firmware 18 includes firmware, a hardware device which stores and executes this firmware is connected to the evaluator's computer C1 (or the evaluator's computer C1 constitutes such a hardware device). In this case, the software I/F unit 17 is constituted by a driver for driving such a hardware device.

Figure 2:
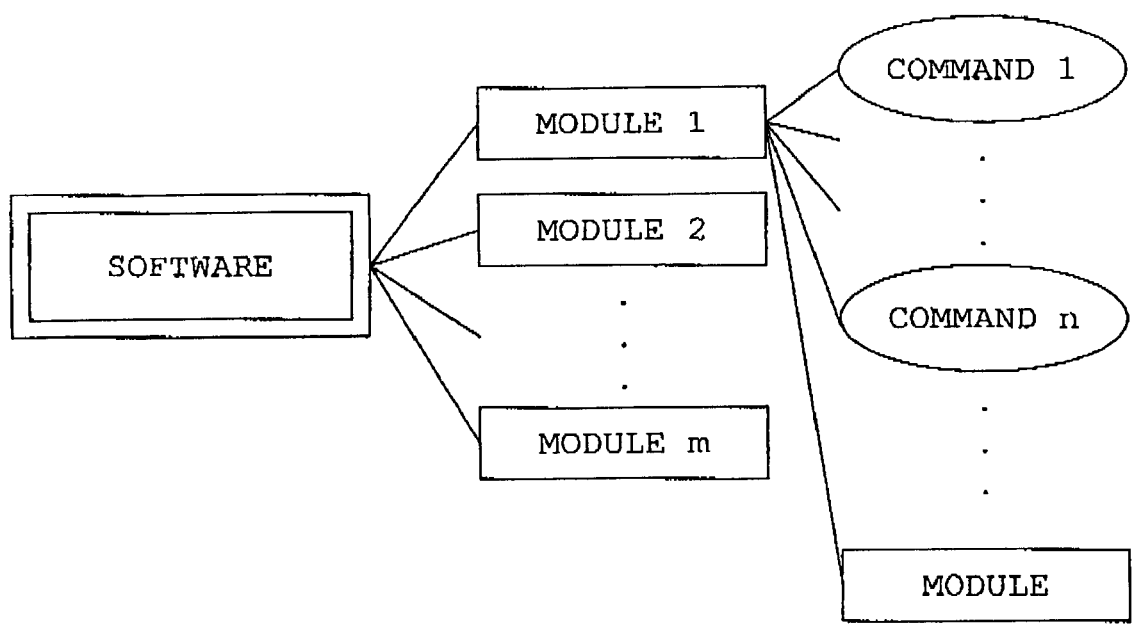
FIG. 2 is a diagram showing a structure of software/firmware to be evaluated.

As shown in FIG. 2, the target software or firmware to be developed is constituted by program modules which form the base of the software or firmware. Each of those program modules is constituted by function units such as subordinate modules or commands. Each command is constituted by a function or an object, for example.

Figure 3:
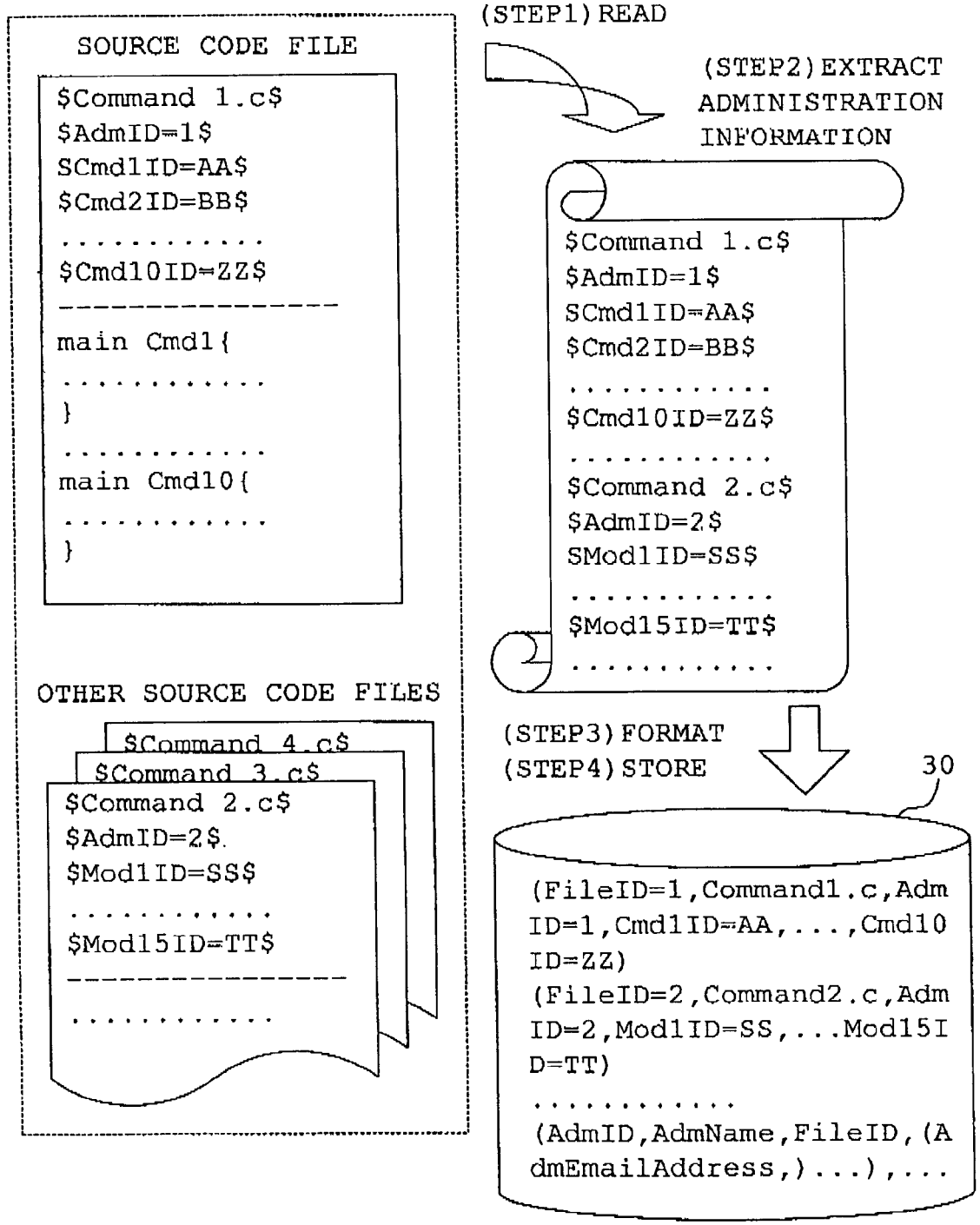
FIG. 3 is a diagram for explaining processes of writing administration information in a source code, file, and registering the administration information to an administration information database.

FIG. 3 is a diagram showing a process controlled by the administration information registration unit 11. Firstly, the present software evaluation system writes administration information in each source code file constituting the target software to be developed. It is preferable that the source administrator write the administration information in a source code tile at the time he/she creates this source code file.

To be specific, the administration information includes the name of the source code file, an administrator identification code (AdmID) indicating the administrator of this source code file, and an identification code of a k-th (k is a positive integer) command or module defined in this source code tile (CmdkID, or ModkID), as described above. The administration information is written as a character string in which an equation defining the value of an identification code is sandwiched by two unique symbols, as shown in FIG. 3. In FIG. 3, such unique symbols are a letter "$", the value of the administrator identification code is "1", and the values of the identification codes of a first, second, and tenth commands are "AA", "BB", and "ZZ", respectively.

The administrator identification code is information uniquely identifying a specific administrator in a developer group. The identification code of a command or module is information uniquely identifying only this command or module among commands or modules of the target software to be developed.

Next, the evaluator's computer C1 performs the process of extracting administration information from each source code file and storing the extracted information in the administration information database 30 in accordance with the control of the administration information registration unit 11. This process has to be performed prior to the evaluation process. However, the process of registering the administration information in the administration information database 30 may be performed each time the source administrator creates a source code, file and writes administration information therein. In this case, the administration information of each of the source code files is registered at varied timings.

If the evaluator is to register administration information, he/she controls the evaluator's computer C1 to execute the process of the administration information registration unit 11. Then, the processor of the evaluator's computer C1 reads out the source code file constituting the evaluation target software/firmware 18 from the external storage of the evaluator's computer C1 in accordance with the control of the software access I/F unit 12, in step 1. Then, the processor of the evaluator's computer C1 extracts administration information written in the read source code file, and registers the extracted information in the administration information database 30, in step 2.

Specifically, the processor of the evaluator's computer C1 searches the read source code file to discover character strings enclosed by unique symbols $, and extracts data such as the name of the source code file, the administrator identification code, command identification codes, etc. that constitute the administration information. Then, the processor affixes predetermined information to the extracted data, organizes the data into a predetermined format in step 3, and stores the data in the administration information database 30 in step 4. The predetermined information to be affixed to the administration information extracted from the source code file may be a source code file identification code (FileID) for identifying the source code file, the name of the source administrator (AdmName), an e-mail address of the source administrator (AdmE-mailAddress), etc., as shown in FIG. 3. The format of the data to be stored in the administration information database 30 may be such that data pieces constituting the administration information of each source code file, and data pieces affixed to the administration information are lined in a string with commas sectioning the data pieces, and the whole string is parenthesized, as shown in FIG. 3.

Figure 4:
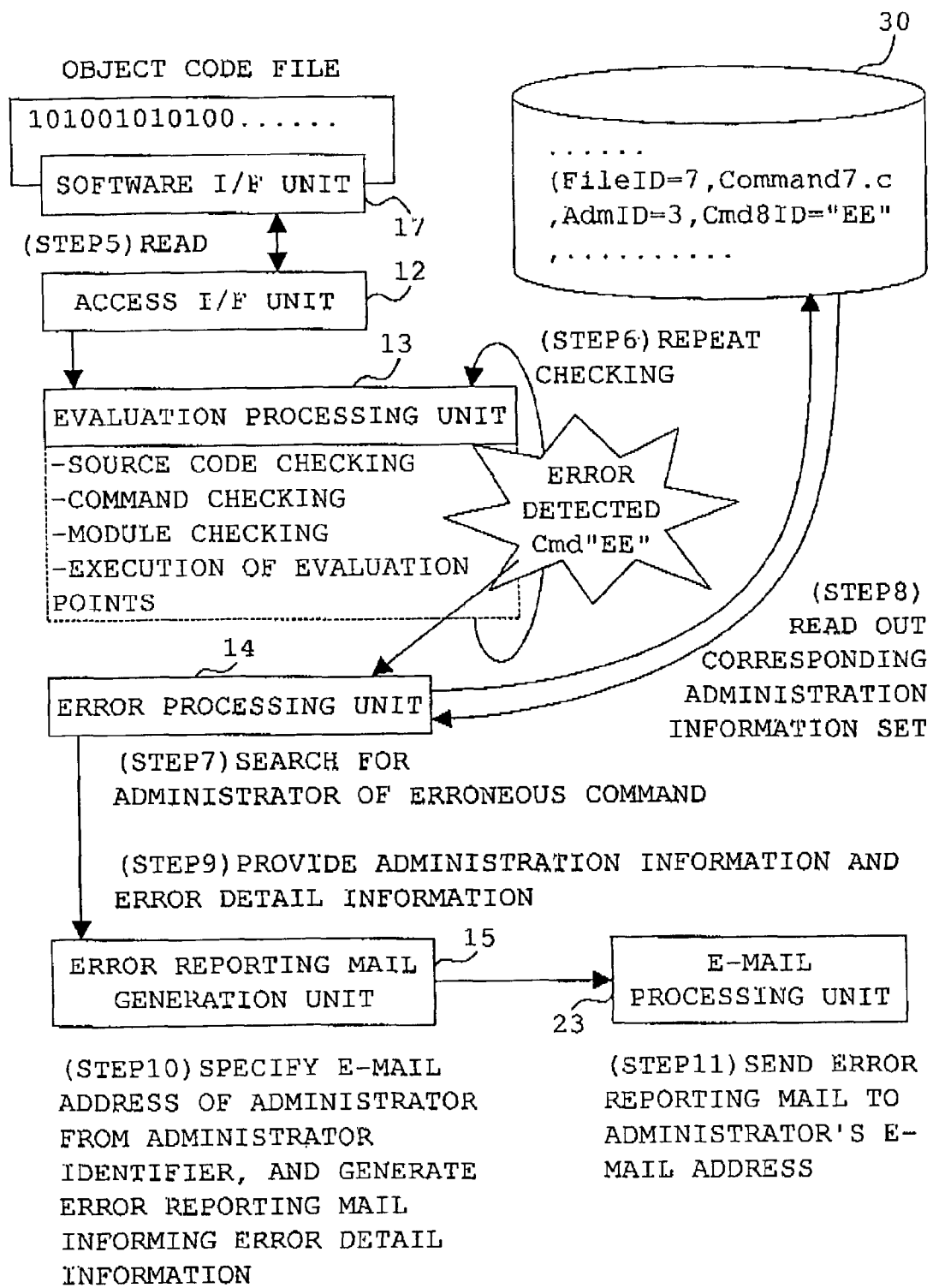
FIG. 4 is a diagram showing a flow of a software evaluation process.

Next, the evaluation process will be explained. FIG. 4 is a diagram showing the flow of the evaluation process.

After confirming that the registration of the administration information is finished, the evaluator operates the evaluator's computer C1 to execute the evaluation processing unit 13. When starting the process controlled by the evaluation processing unit 13, i.e., the evaluation process, the processor of the evaluator's computer C1 accesses an object code file constituting the evaluation target software/firmware 18 in accordance with the control of the software access I/F unit 12 and the software I/F unit 17, in step 5. The evaluator's computer C1, which executes the evaluation processing unit 13, sequentially tries the evaluation points constituting the evaluation process, in accordance with instructions of the evaluator who operates the evaluator's computer C1, in step 6.

If any command or module is proved to he an error or a defect as the result of the evaluation process, the evaluator's computer C1 searches the administration information database 30 in accordance with the control of the error processing unit 14, and specifies administration information regarding the command or module proved to be an error or a defect, in step 7. In this search, the identification code of the erroneous command or module is used as a search key. For example, as shown in FIG. 4, in a case where a command whose identification code (CmdID) is "EE" is detected as an error as the result of the evaluation process, the evaluator's computer C1 searches the administration information database 30 using the identification code (i.e., "EE") of this command as a key. Then, the evaluator's computer specifies the administration information of this command, i.e., the administrator identification code of the administrator of the source code file in which the error command is defined (AdmID, "3" in the example of FIG. 4), the identification code of the source code file (FileID, "7" in the example of FIG. 4), and the name of the source code file. Then, the evaluator's computer C1 reads out the specified administration information, and transfers, the administration information to the error reporting mail generation unit 15, in step 8.

In addition, under the control or the error processing unit 14, the evaluator's computer C1 generates error detail information indicating tie kind and symptoms of the detected error or defect, and hands over this error detail information and an instruction for generation and sending of an error reporting mail to the error reporting mail generation unit 15, in step 9.

When the instruction for generation and sending of an error reporting mail is sent from the error processing unit 14 to the error reporting mail generation unit 15, the evaluator's computer C1 executing the error reporting mail generation unit 15 specifics the e-mail address (AdmE-mailAddress) of the administrator identified by the administrator identification code included in the administration information transferred from the error processing unit 14, in step 10.

The evaluator's computer C1 may specify the e-mail address of the source administrator along with the administrator identification code of the source administrator under the control of the error processing unit 314, and transfer the specified e-mail address to the error reporting mail generation unit 15.

Then, under the control of the error reporting mail generation unit 15, the evaluator's computer C1 generates an error reporting mail addressed to the administrator, using the name and file identification code of the source code file in which the command or module detected as au error or defect, the name, administrator identification code, And e-mail address of the administrator of the source code file are written, and the error detail information. If another source code file has relevance to the command or module detected as an error or defect, this error reporting mail may also be addressed to the administrator of this source code file.

An example of the error reporting mail is illustrated in FIG. 5. Evaluation process information, the identification code of the command or module detected as an error, the identification code and name of the source code file in which the error command or module is defined, and the error detail information are indicated in the error reporting mail illustrated in FIG. 5. Information regarding another source code file relating to the command or module detected as an error may further be indicated in the error reporting mail.

Figure 6:
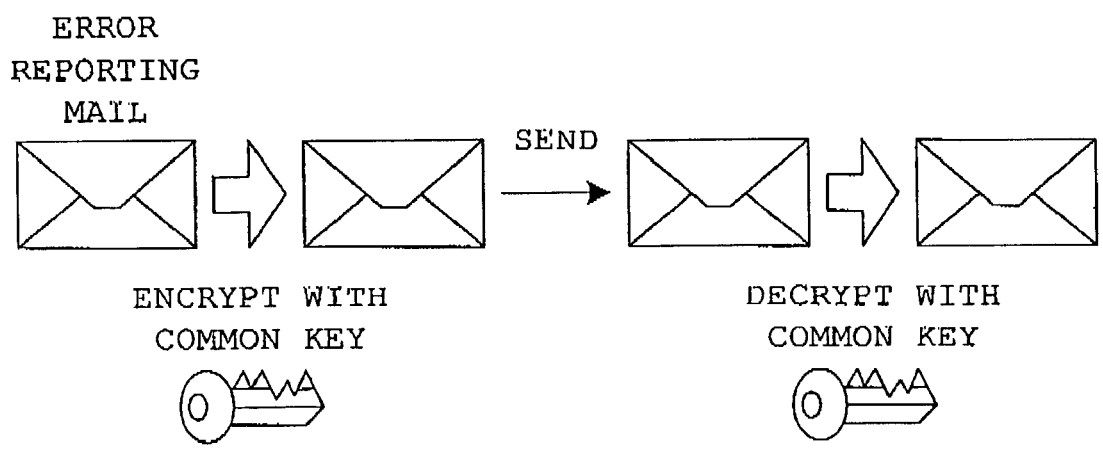
FIG. 6 is a diagram showing an error reporting mail encrypting process.

Then, in order to prevent leakage of information regarding the source code, the evaluator's computer C1 encrypts the error reporting mail in accordance with the control of the mail encrypting processing unit 16, and sends the error reporting mail based on a predetermined e-mailing protocol, in step 11. As shown in FIG. 6, this encryption is performed using a common key encrypting method. According to the common key encrypting method, there is a problem that encrypted data is sent to the addressee, and separately, a decryption key for this data has to be sent to the addressee in a safe manner. However, the common key encrypting method is a simple method, and thus has an advantage that the encrypting and decrypting processes can be accelerated. Accordingly, this method suffices for such a case as the present embodiment.

The source administrator receives the error reporting mail by controlling the source administrator's computer C2 to execute the e-mail processing unit 23, for example. Based on the administration information reported by this error reporting mail, the source administrator's computer C2 specifies the source code file in which the command or module detected as an error or defect is defined, and corrects (debugs) the specified source code file. After correction, the source administrator's computer C2 sends a correction reporting mail for informing that the correction of the source code file has been completed to the evaluator. The evaluator receives this correction reporting mail by controlling the evaluator's computer C1 to execute the e-mail processing unit of the software evaluation tool 100, for example. Then, the evaluator controls the evaluator's computer C1 to repeatedly perform the evaluation process on the portion detected as an error or defect.

Figure 7:
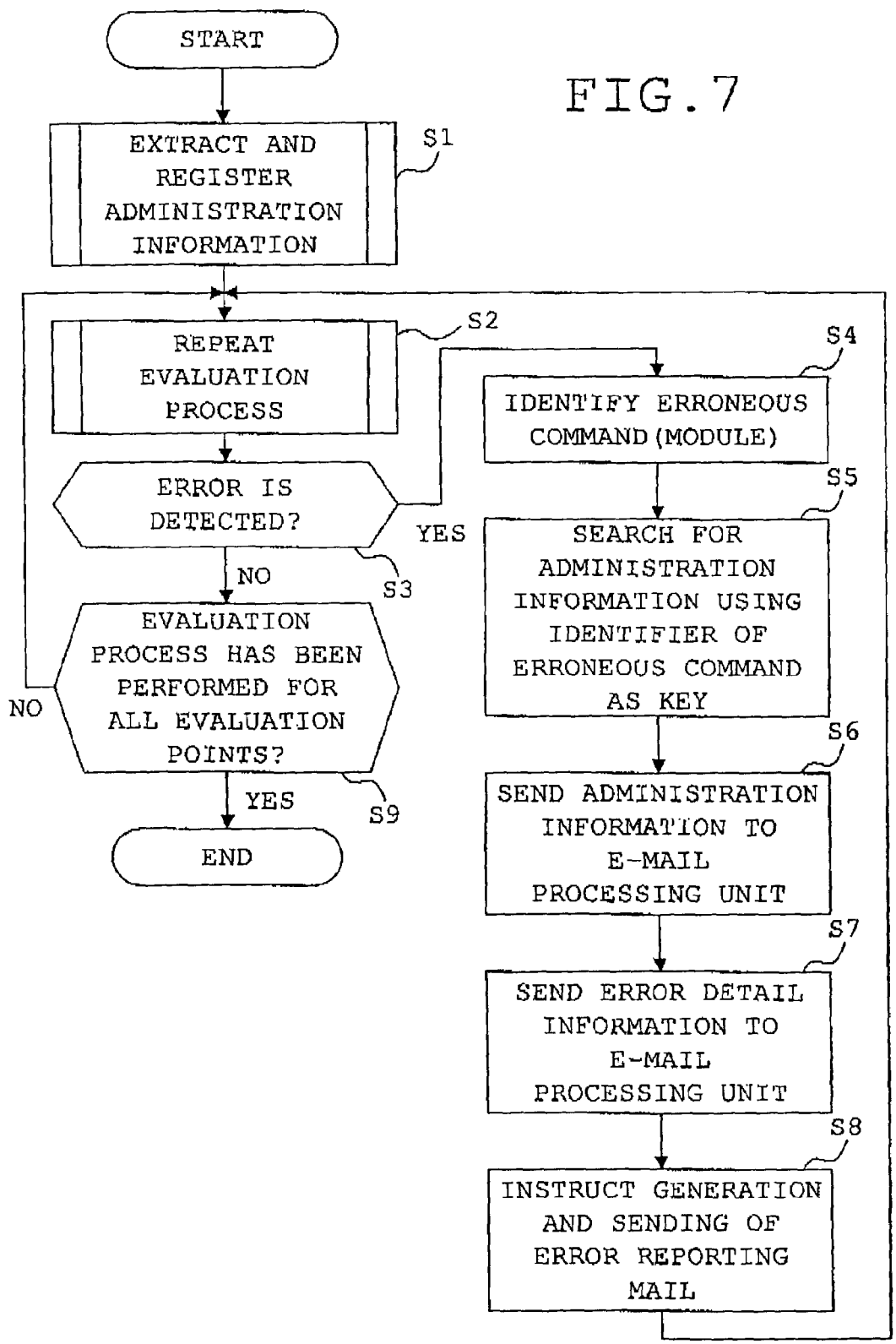
FIG. 7 is a flowchart showing operations of the software evaluation system according to the embodiment of the present invention.

FIG. 7 is a flowchart showing the control performed by the present software evaluation system and software evaluation tool 100. It is assumed that the above-explained administration information is already written in each source code file of a module or command constituting target software to be developed. As a preparatory step of the evaluation process, the evaluator controls the evaluator's computer C1 to execute the software access I/F unit 12 and the administration information registration unit 11, in order to extract the administration information from each source code file constituting the target software to be evaluated and register the extracted administration information in the administration information database 30 (step S1). However, in a case where the source administrator or the like has already registered the administration information, step S1 may be skipped.

When confirming that registration of the administration information of each source code file has been completed, the evaluator controls the evaluator's computer C1 to execute the evaluation processing unit 13, in order to perform the evaluation process on the evaluation target software/firmware 18 based on the predetermined evaluation points (step S2). The evaluation process is repeatedly performed on the basis of a predetermined evaluation processing unit.

In a case where an error is detected or the software is determined as defective in a given evaluation processing unit (step S3; Yes), the evaluator's computer C1 performs the error handling process (steps S4 to S8) under the control of the error processing unit 14. First, the evaluator's computer C1 identifies the portion of the program detected as an error, and specifies the identification code of the error command or module (step S4).

Then, the evaluator's computer C1 accesses and searches the administration information database 30 using the specified identification code of the error command or module as a key, and specifies information regarding the administrator of the source code file of the error command or module (i.e., the administrator identification code, name, etc.) (step S5). Then, when acquiring the administration information regarding the command or module detected as an error or defect from the administration information database 30, the evaluator's computer C1 sends the acquired administration information together with error detail information to the error reporting mail generation unit 15 (step S6, and step S7). Then, the evaluator's computer C1 instructs the error reporting mail generation unit 15 to generate and send an error reporting mail (step S8), and returns to the evaluation process for another evaluation processing unit. In parallel, the evaluator's computer C1 generates and sends an error reporting mail in response to the instruction given by the error processing unit 14, under the control of the error reporting mail generation unit 15. The error handling process may be performed simultaneously after the evaluation process for all the evaluation processing units is completed.

In a case where the evaluator's computer C1 determines that no error or defect is found in any evaluation processing unit (step S3; No), the evaluator stores the evaluation results it necessary, and confirms whether the evaluation process has been completed for all the evaluation points (step S9). Then, the evaluator controls the evaluator's computer C1 to terminate the evaluation process. The above is the flow of the evaluation process.

FIG. 8 shows processes to be performed after error reporting. If any portion is detected as an error or defect by the evaluator's computer C1 as the result of the evaluation process, an error reporting mail is sent to the administrator of the source code file in which the portion detected as an error or defect is defined. The source administrator controls the source administrator's computer C2 to execute the e-mail processing unit 23, thereby to receive this error reporting mail. Then, the source administrator checks the content of the error reporting mail in step 12. In this error reporting mail, the identification code and name of the source code file in which the command or module detected as an error or defect is defined are indicated. Therefore, the source administrator can immediately specify the corresponding source code file based on the written content of this error reporting mail.

The source administrator checks and debugs the source code file which is specified based on the content of the error reporting mail, in step 13. Then, the source administrator controls the source administrator's computer C2 to execute the e-mail processing unit 23, in order to generate in stop 14 a correction reporting mail informing that the corresponding source code file has been corrected, and send in step 15 the generated mail to the e-mail address of the evaluator. The correction reporting mail contains information such as the identification code of the corrected source code file.

The evaluator controls the evaluator's computer C1 to execute the e-mail processing unit of the software evaluation tool 100 thereby to receive the correction reporting mail. Then, the evaluator checks this correction reporting mail in step 16 and repeats the evaluation process on the program part which includes the portion defined in the corrected source code file in step 17. In accordance with those procedures, feedback is performed between the evaluator and the source administrator.

The software evaluation system according to this embodiment is not limited to the above described structure.

For example, the evaluator's computer C1 and the storage device S may be realized by the same server computer.

In the above explanation, the evaluator's computer C1 affixes predetermined information to the administration information extracted from a source code file before registering the administration information in the administration information database 30. Instead, the source administrator may embed the predetermined information in each source code file in advance by controlling the source administrator's computer C2.

Explanation of the embodiment of the present invention has been completed. The software evaluation system according to the present invention may be realized by an ordinary computer system, not by a specialty-prepared system.

The software evaluation system performing the above described processes can be structured by installing programs for controlling computers to execute operations of the above described evaluator's computer C1, source administrator's computer C2 and storage device S in a plurality of computers connected to one another through a network N from recording media (CD-ROM, MO, flexible disk, etc.) storing such programs.

Those programs may be uploaded on a bulletin board (BBS) of a communication line, and may be distributed through this communication line. Or, carrier waves may be modulated by signals representing those programs, and the obtained modulated waves may be transmitted. Apparatuses which receive the modulated waves may demodulate the modulated waves and restore those programs.

By starting those programs and executing those programs under the control of an operating system (OS) like executing other application programs, the above described processes can be performed.

In a case where the OS shares some parts of the processes, or the OS constitutes a part of a component included in the present invention, programs from which those parts are excluded may be stored in recording media. Also in this case, according to the present invention, programs for realizing each function and step performed by computers are stored in the recording media.

As obvious from the above explanation, according to the present invention, in evaluating software or firmware to be developed, detailed evaluation results including error information of the evaluated program can be promptly reported to the programmer. Accordingly, the creator of the program can immediately specify the program including an error and reexamine this program based on the error information. Therefore, not only the software evaluation/debugging processes, but also the entire development process can be improved in efficiency.

Further, in development of software or firmware, administration information regarding source code files, administrators of the source code files, and commands and modules defined in the source code files can be utilized effectively.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-284765 filed on Sep. 19, 2001 and including specification, claims, drawings and summary. The disclosure of the above Japanese Patent Application is incorporated herein by reference in its entirety.

What is claimed is:

1. A software evaluation system comprising:
  a storage device which stores a database in which as administration information of a program, source code identification information for identifying a source code representing the program, function unit identification information for identifying function units of the program which are defined by the source code, and an address of an administrator of the source code are stored; and
    an evaluation computer which performs an evaluation process on a program to be evaluated to determine whether the program to be evaluated includes any function unit that does not function correctly, and when determining that the program includes such said function unit that does not function correctly, obtains administration information of the program to be evaluated from said database, generates an error report which includes said source code identification information and said function unit identification information included in the obtained administration information, encrypts said error report, and sends said encrypted error report to said address of an administrator of the source code included in the obtained administration information; wherein said evaluation computer encrypts the source code identification information and the function unit identification information before externally sending them.

2. The software evaluation system according to claim 1, wherein function units of the program are constituted by commands and/or modules constituting the program.

3. The software evaluation system according to claim 1, further comprising a source administration computer which affixes to the source code representing the program, administration information thereof,
  wherein said evaluation computer extracts the administration information affixed to the source code and stores the extracted administration information in said database.

4. The software evaluation system according to claim 1, wherein:
  the program to be evaluated is stored as firmware in a predetermined device; and
  said evaluation computer functions as a driver for driving said predetermined device.

5. A software evaluation apparatus which is constituted by a computer having access to a database in which as administration information of a program, source code identification information for identifying a source code representing the program, function unit identification information for identifying function units of the program which are defined by the source code, and an address of an administrator of the source code are stored, wherein said computer performs an evaluation process on a program to be evaluated to determine whether the program to be evaluated includes any function unit that does not function correctly, and when determining that the program includes such said function unit that does not function correctly, obtains administration information of the program to be evaluated from said database, generates an error report which includes said source code identification information and said function unit identification information included in the obtained administration information, encrypts said error report, and sends said encrypted error report to said address of an administrator of the source code included in the obtained administration information; wherein said computer encrypts the source code identification information and the function unit identification information before externally sending them.

6. The software evaluation apparatus according to claim 5, wherein function units of the program are constituted by commands and/or modules constituting the program.

7. The software evaluation apparatus according to claim 5, wherein:
  administration information regarding the source code representing the program is affixed to the source code; and
  said computer extracts the administration information affixed to the source code and stores the extracted administration information in said database.

8. The software evaluation apparatus according to claim 5, wherein:
  the program to be evaluated is stored as firmware in a predetermined device; and said computer functions as a driver for driving said predetermined device.

9. A software evaluation method comprising:
storing as administration information of a program, source code identification information for identifying a source code representing the program, function unit identification information for identifying function units of the program which are defined by the source code, and an address of an administrator of the source code in a database; and
performing an evaluation process on a program to be evaluated to determine whether the program to be evaluated includes any function unit that does not function correctly, and when determined that the program includes such said function unit that does not function correctly, obtaining administration information of the program to be evaluated from said database, generating an error report which includes said source code identification information and said function unit identification information included in the obtained administration information, encrypting said error report, and sending said encrypted error report to said address of an administrator of the source code included in the obtained administration information; wherein said evaluation process encrypts the source code identification information and the function unit identification information before externally sending them.

10. The software evaluation method according to claim 9, wherein:
administration information regarding the source code representing the program is affixed to the source code; and
said storing extracts the administration information affixed to the source code and stores the extracted administration information in said database.

11. A computer-readable recording medium which stores a program for controlling a computer having access to a database in which as administration information of a program, source code identification information for identifying a source code, representing the program, function unit identification information for identifying function units of the program which are defined by the source code, and an address of an administrator of the source code are stored, said program to perform the functions of:
performing an evaluation process on a program to be evaluated to determine whether or not the program to be evaluated includes any function unit that does not function correctly, and when determining that the program includes such said function unit that does not function correctly, obtaining administration information of the program to be evaluated from said database, generating an error report which includes said source code identification information and said function unit identification information included in the obtained administration information, encrypting said error report, and sending said encrypted error report to said address of an administrator of the source code included in the obtained administration information; wherein said evaluation process encrypts the source code identification information and the function unit identification information before externally sending them.

12. A computer readable storage media which stores programs for controlling a computer that has access to a database in which as administration information of a program, source code identification information for identifying a source code representing the program, function unit identification information for identifying function units of the program which are defined by the source code, and an address of an administrator of the source code are stored, said programs to perform the functions of:
performing an evaluation process on a program to be evaluated to determine whether or not the program to be evaluated includes any function unit that does not function correctly, and when determining that the program includes such said function unit that does not function correctly, obtaining administration information of the program to be evaluated from said database, generating an error report which includes said source code identification information and said function unit identification information included in the obtained administration information, encrypting said error report, and sending said encrypted error report to said address of an administrator of the source code included in the obtained administration information; wherein said evaluation process encrypts the source code identification information and the function unit identification information before externally sending them.

13. A computer-readable recording medium which stores a program for controlling a computer to perform the functions of:
storing a database in which as administration information of a program, source code identification information for identifying a source code representing the program, function unit identification information for identifying function units of the program which are defined by the source code, and an address of an administrator of the source code are stored; and
performing an evaluation process on a program to be evaluated to determine whether or not the program to be evaluated includes any function unit that does not function correctly, and when determining that the program includes such said function unit that does not function correctly, obtaining administration information of the program to be evaluated from said database, generating an error report which includes said source code identification information and said function unit identification information included in the obtained administration information, encrypting said error report, and sending said encrypted error report to said address of an administrator of the source code included in the obtained administration information; wherein said evaluation process encrypts the source code identification information and the function unit identification information before externally sending them.

14. A computer data representing a program for controlling a computer to perform the functions of:
storing a database in which as administration information of a program, source code identification information for identifying a source code representing the program, function unit identification information for identifying function units of the program which are defined by the source code, and an address of an administrator of the source code are stored; and
performing an evaluation process on a program to be evaluated to determine whether or not the program to be evaluated includes any function unit that does not function correctly, and when determining that the program includes such said function unit that does not function correctly, obtaining administration information of the program to be evaluated from said database, generating an error report which includes said source code identification information and said function unit identification information included in the obtained administration information, encrypting said error report, and sending said encrypted error report to said address of an administrator of the source code included in the obtained administration information; wherein said evaluation process encrypts the source code identification information and the function unit identification information before externally sending them.

* * * * *